(12) United States Patent
Brazeau

(10) Patent No.: US 9,639,824 B1
(45) Date of Patent: May 2, 2017

(54) DYNAMICALLY-SIZED CONTAINERS FOR INVENTORY SYSTEM

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 14/579,775

(22) Filed: Dec. 22, 2014

(51) Int. Cl.
| | | |
|---|---|---|
| *G06Q 10/08* | (2012.01) | |
| *B65D 21/02* | (2006.01) | |
| *G06Q 10/06* | (2012.01) | |
| *G06F 17/50* | (2006.01) | |

(52) U.S. Cl.
CPC ....... *G06Q 10/087* (2013.01); *B65D 21/0204* (2013.01); *B65D 21/0208* (2013.01)

(58) Field of Classification Search
USPC ............ 220/4.26, 4.28, 4.31, 558; 224/275; 700/97; 703/1
See application file for complete search history.

(56) References Cited

U.S. PATENT DOCUMENTS

| | | | | |
|---|---|---|---|---|
| 7,617,947 | B2 * | 11/2009 | Schafer | B65D 21/045 16/354 |
| 8,280,547 | B2 | 10/2012 | D'Andrea et al. | |
| 2008/0142558 | A1 * | 6/2008 | Dexter | B60R 7/02 224/275 |
| 2009/0261093 | A1 * | 10/2009 | Fullerton | B25H 3/021 220/4.28 |
| 2012/0143427 | A1 | 6/2012 | Hoffman et al. | |
| 2014/0067104 | A1 * | 3/2014 | Osterhout | G06Q 50/28 700/97 |

* cited by examiner

*Primary Examiner* — Scott Zare
*Assistant Examiner* — Reva R Danzig
(74) *Attorney, Agent, or Firm* — Kilpatrick Townsend & Stockton LLP

(57) ABSTRACT

Containers for an inventory system can be formed from a set of container segments bounded by container partitions. The container segments can be coupled end to end to one another and include receiving features for receiving partitions therein. A segment can separate from an adjacent segment in response to receiving a partition in a receiving feature at an end of one of the segments, or in response to interaction with decoupler distinct from the partition. Containers of differing lengths can be provided by using partitions to bound different numbers of interconnected segments.

20 Claims, 13 Drawing Sheets

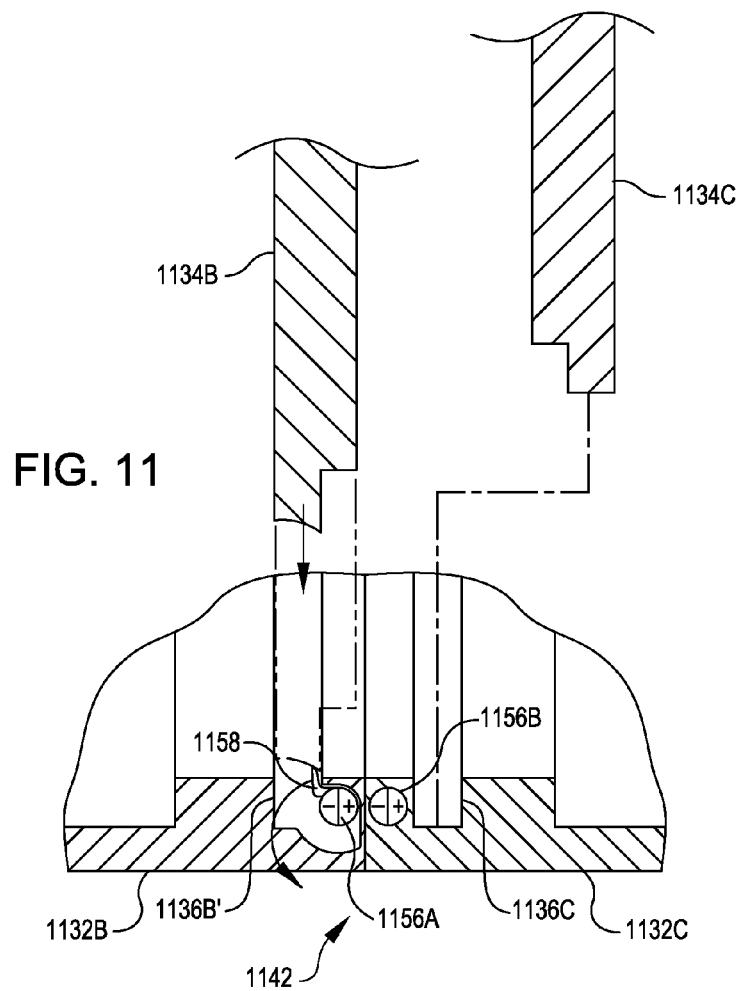
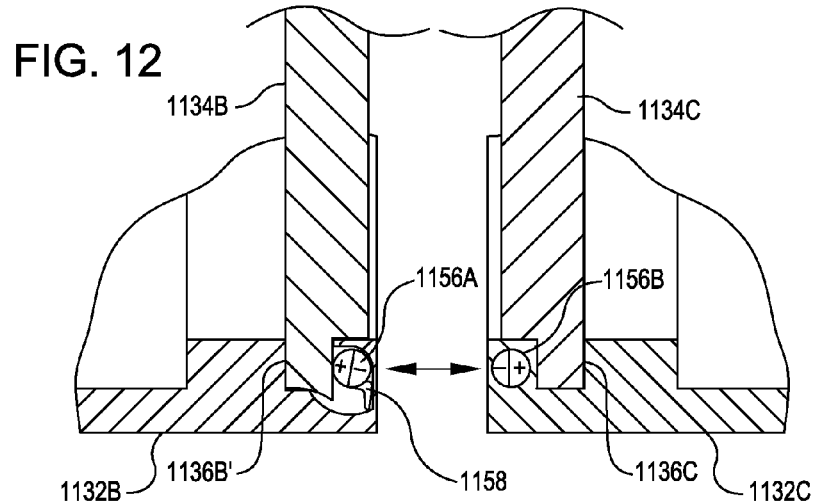

DYNAMICALLY-SIZED CONTAINERS FOR INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIGS. 11 and 12 illustrate an example of partitions for decoupling a coupling mechanism having a movable magnet according to particular embodiments;

DETAILED DESCRIPTION

Figure 1:
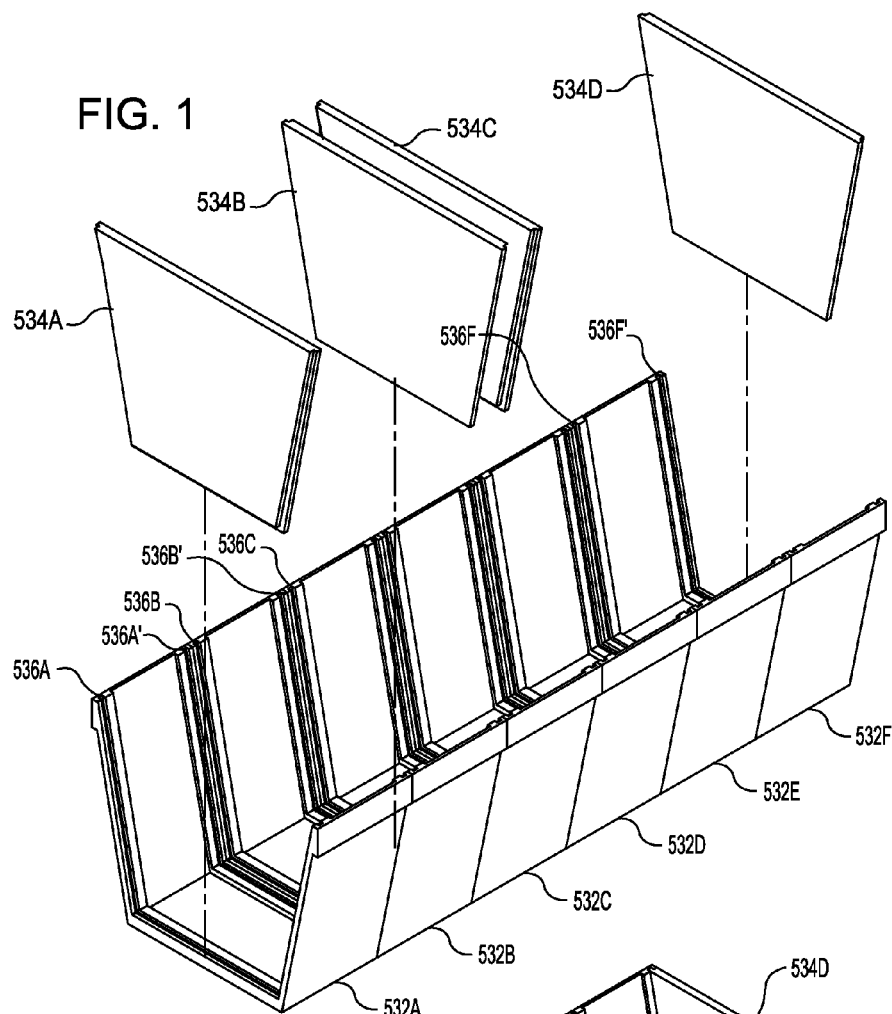
FIG. 1 illustrates container segments and container partitions for forming dynamically-sized containers according to particular embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to dynamically-sized containers, such as may be used for storing and/or transporting inventory items within an inventory system. Dynamically-sized containers can be formed to provide containers suitably sized for individual inventory items or sets of inventory items. Providing containers sized for particular items can increase storage density or otherwise improve efficiency of storage space within the inventory system. In embodiments, the dynamically-sized containers are used within an inventory system having multiple inventory holders and drive units for moving the inventory holders, but the features can be used in other inventory systems or in other environments.

Dynamically-sized containers can be formed from container segments and container partitions (hereinafter, "segments" and "partitions"). A number of segments can be interconnected end to end in series and bounded at the ends of the series with partitions so as to provide a container of a particular dimension (e.g., length). The dimension can correspond to the number of segments extending between the partitions. For example, one dynamically-sized container may include a pair of partitions positioned at opposite ends of two interconnected segments, while another dynamically-sized container may include a pair of partitions positioned at opposite ends of a single segment, and yet other dynamically-sized containers may include a pair of partitions positioned at opposite ends of three or more interconnected segments. Thus, in an example embodiment, an operator of an inventory system having a set of 10 cm segments may construct a 30 cm container by adding a pair of partitions at either end of a chain of three interconnected segments to accommodate an inventory item having a length of 25 cm, or—with equal ease and utilizing the same supply of pieces—construct a 10 cm container by adding a pair of partitions at either end of a single segment if instead presented with an inventory item having a length of 9 cm.

Ends of adjacent segments can be connected to one another by coupling mechanisms. Examples of coupling mechanisms include hook and loop fasteners, magnets, and latches. A decoupler may interact with a coupling mechanism to decouple the components of the coupling mechanism and cause joined adjacent segments to separate from one another, such as for formation into distinct containers. As an illustrative example, a decoupler may include a wedge to be inserted between hook elements and loop elements of a fastener to cause separation of segments bearing the respective elements. A decoupler may be a feature of a partition (e.g., such that an operation of installing a partition relative to a segment causes a coupling mechanism to decouple) or a feature distinct from a partition (e.g., such that segments are separated by the decoupler to facilitate installation of partitions along edges at the ends of the separated segments).

Referring now to the drawings, in which like numerals may refer to like elements having like names across the various figures, FIG. 1 illustrates an example of segments 532 and partitions 534 for forming dynamically-sized containers. The illustrated segments 532 are U-shaped, forming a trough having a bottom from which left and right sidewalls extend at an angle outward from vertical. Front and rear edges of the trough run along the open ends such that the left and right sidewalls extend between the front and rear edges. Although illustrated as angled outward from vertical, the sidewalls may also be substantially vertical and/or may form a curve with the bottom. The illustrated partitions 534 are flat panels having bottom, left, and right side edges that substantially match the cross-sectional profile provided by the left sidewall, bottom, and right sidewall of the segments 532.

The segments 532 (e.g., individually denoted as 532A-532F in FIG. 1) are interconnected in series, end to end. Each particular segment 532 at each end includes a groove or other suitable receiving feature 536 or 536' (e.g., individually denoted as 536A, 536A' etc. in FIG. 1, and collectively referred to as grooves 536), which is sized for receiving and securing any of the partitions 534 (e.g., individually denoted as 534A-534D in FIG. 1). For example, a groove 536 of a particular segment 532 can be sized to receive and secure pegs, ridges, or other features of a partition 534 so that at least the bottom and lower side edges of the partition 534 meet the bottom and sidewalls of the segments 532 to form a closed face across an open end of the segment 532.

Figure 2:
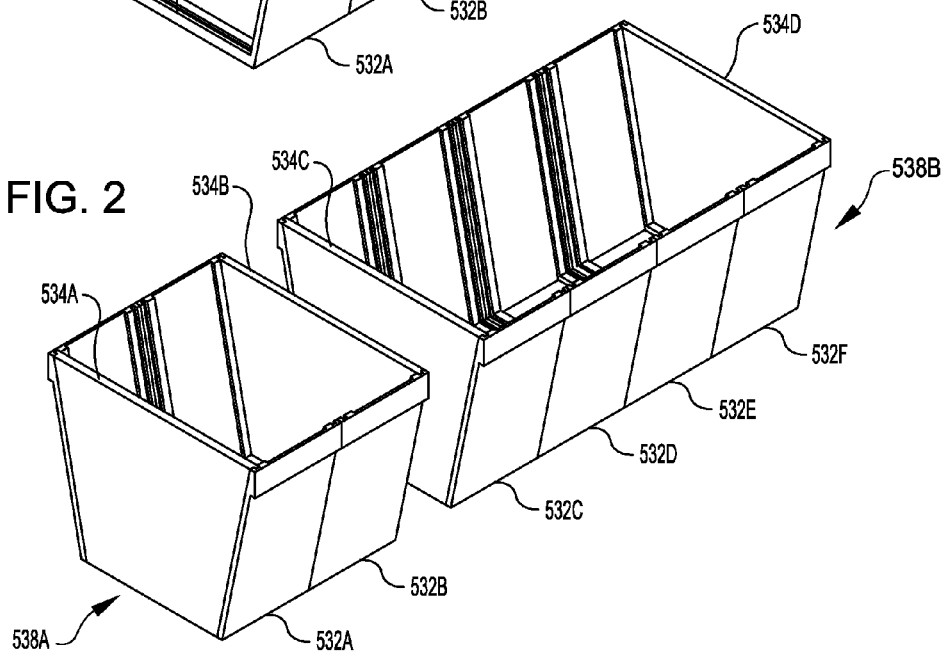
FIG. 2 illustrates an example of containers of different sizes formed by the segments and partitions of FIG. 1.

FIG. 2 shows examples of dynamically-sized containers 538 that may be formed by the components of FIG. 1. In this example, the segments 532 shown in FIG. 1 are separated to form two different containers 538. However, any number of containers 538 could be formed with the six segments 532 (e.g., up to six containers) shown in FIG. 1, and/or containers 538 can be formed on the fly by assembling segments 532, instead of separating segments 532 into discreet containers 538. In the illustrated example, a first container 538A is formed by mounting the partitions 534A and 534B on opposite ends of the first segment 532A and the second segment 532B. For example, the partitions 543A and 534B may be inserted into the grooves 536A and 536B' (FIG. 1). A second container 538B of a different size is formed by placement of the partitions 534C and 534D on opposite ends of the third segment 532C and the sixth segment 532F (e.g., into the grooves 536C and 536F' of FIG. 1). Such an arrangement of partitions 534A-534D provides a first container 538A with a length of two segments 532 and a second container 538B with a length of four segments 532.

In the illustrated example of FIGS. 1 and 2, the segments 532 are releasably connected to one another by coupling mechanisms and are separable from one another in response to insertion of the partitions 534 into the grooves 536 and 536' on either side of a joint between any two adjacent segments 532. For example, insertion of the partitions 534B and 534C into the respective grooves 536B' and 536C (as in FIG. 1) causes the segments 532B and 532C to separate from one another (as in FIG. 2). Either or both of the partitions 534B and 534C can include features for decoupling the segments 532B and 532C from one another. Likewise, either or both of the partitions 534B and 534C can include features for preventing the segments 532B and 532C from coupling with each other or other segments 532 while the partitions 534B and 534C are in place. Examples of such decoupling features (in addition to examples of other decouplers that are distinct from the partitions 534) are described below with respect to FIGS. 8-20. Such functionality may prevent segments 532 that have been formed into a dynamically-sized container 538 from inadvertently becoming joined with additional segments 532 that are not part of the formed container 538.

FIGS. 1 and 2 further illustrate that a contiguous chain of the segments 532 can be used to rapidly and easily form dynamically-sized containers 538 by insertion of partitions 534 at suitable intervals. For example, a first partition 534A is removably (or permanently) mounted on a front end of a first segment 532A in the chain (e.g., inserted into a groove 536A) to form a first end of a container 538A. A second partition 534B is installed on a rear end of any subsequent segment 532 in the chain (e.g., inserted into a groove 536B' of the second segment 532B) to sever the subsequent segment 532B from the chain and form a second end of the container 538A. The two partitions 534A and 534B thus bound the ends of a series of segments 532 (e.g. 532A and 532B) interposed between the two partitions 534A and 534B to form the first container 538A. Continuing, a third partition 534C is attached on a front end of a next, third segment 532C in the chain (e.g., inserted into a groove 536C) to form a first end of a second container 538B. A fourth partition 534D is placed into the chain several segments 532 later (e.g., inserted into a groove 536F' on a rear end of the sixth segment 532F), forming a second container 538B of a different size and having a body that includes the third partition 534C, the fourth partition 534D, and the segments 532C-532F disposed therebetween. Additional partitions 534 are added along subsequent segments 532 in the chain (e.g., beyond the six initial segments 532 shown in FIGS. 1 and 2) to produce further dynamically-sized containers 538 of any desired length corresponding to the number of segments 532 between the added partitions 534 (e.g., one segment 532 in length, two segments 532 in length, or more than two segments 532 in length).

In some embodiments, a segment 532 forming an extreme end of a chain (e.g., segment 532A and/or segment 532F in FIG. 1) may include a partition 534 that is integrally formed into the segment 532. In such arrangements (and in any arrangement in which partitions 534 are provided at the ends of a plurality of segments 532), a container 538 having multiple segments 532 can be sub-divided into smaller containers 538 by installing a pair of partitions 534 along an edge at which two adjacent segments 532 are joined. For example, with respect to FIGS. 1 and 2, a container formed by the partitions 534A and 534D installed at the extreme ends of the chain or series of segments 532A-532F of FIG. 1 can be sub-divided into the containers 538A and 538B of FIG. 2 by installation of the pair of partitions 534B and 534C along an edge between the segments 532B and 532C.

Additionally, although the above description of FIGS. 1 and 2 primarily references forming dynamically-sized containers 538 by joining partitions 534 with segments 532, it may also be appreciated that dynamically-sized containers 538 can be de-constructed and/or recombined to yield other arrangements of partitions 534 and segments 532. For example, removing the partitions 534B and 534C when the containers 538A and 538B of FIG. 2 are adjacent to one another can facilitate coupling the segments 532B and 532C together to form a larger container 538 (e.g., having the segments 532A-532F between the partitions 534A and 534D) or a chain of segments 532 ready for formation into dynamically-sized containers 538 of any desired size.

Figure 3:
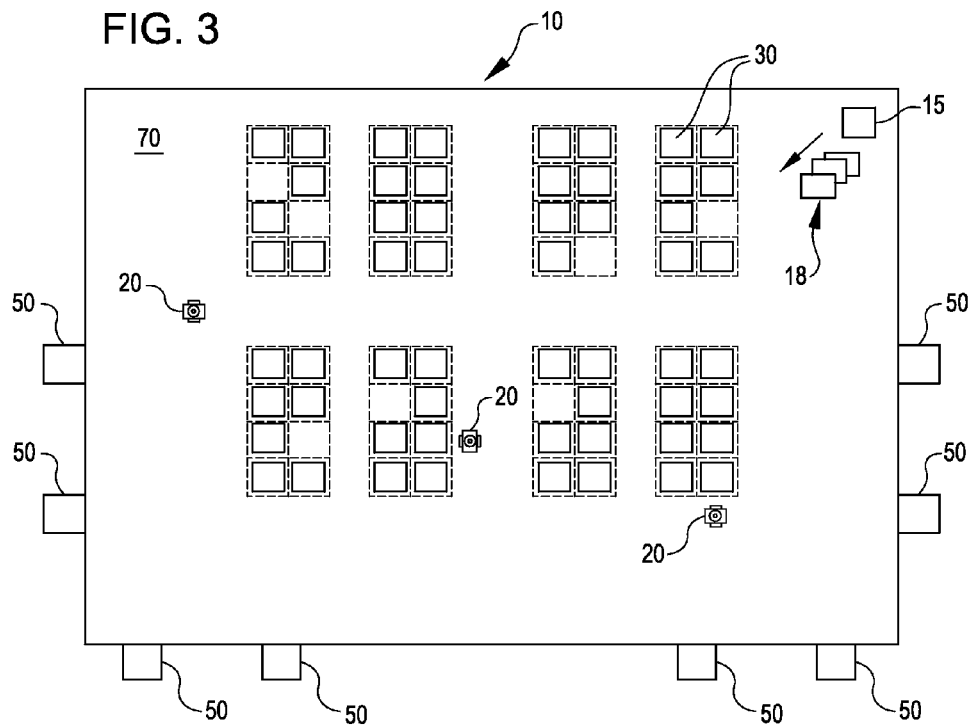
FIG. 3 illustrates components of an inventory system according to particular embodiments.

As mentioned previously, dynamically-sized containers 538 may be suited for use in an inventory system. FIG. 3 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 3 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 4.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 5 and 6.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 3 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 3 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 4:
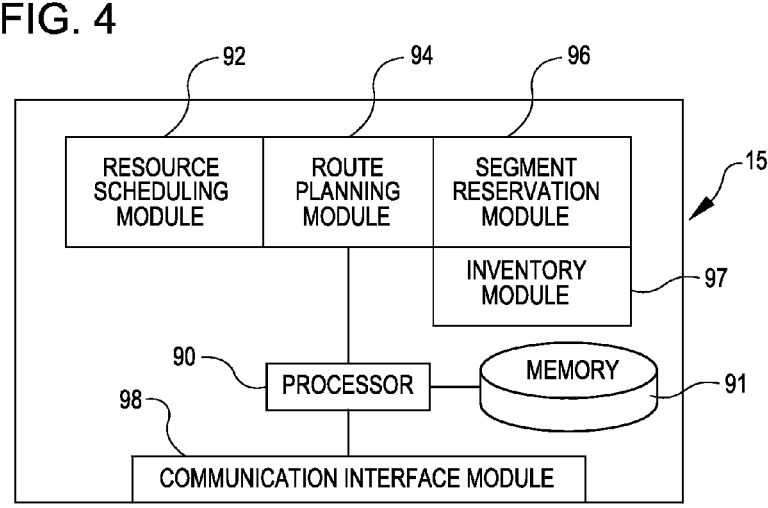
FIG. 4 illustrates in greater detail the components of an example management module that may be utilized in particular embodiments of the inventory system shown in FIG. 3.

FIG. 4 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 5:
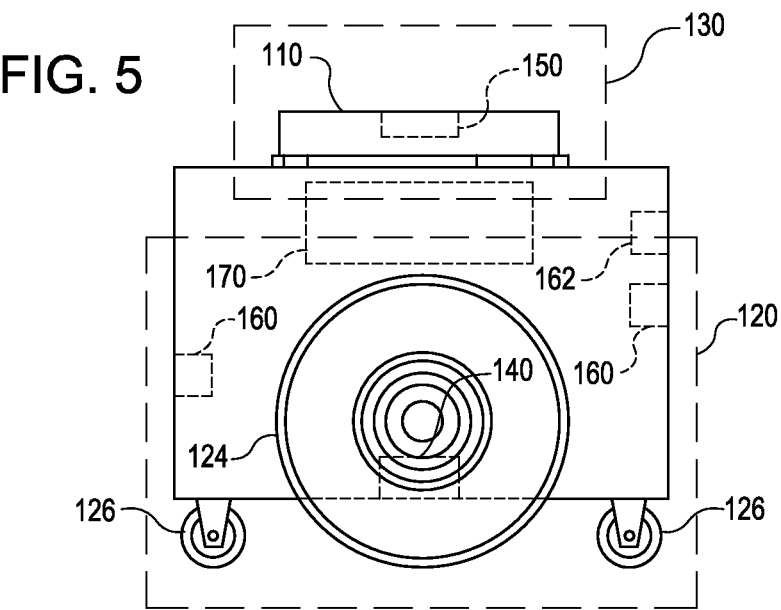
FIGS. 5 and 6 illustrate in greater detail an example mobile drive unit that may be utilized in particular embodiments of the inventory system shown in FIG. 3.
Figure 6:
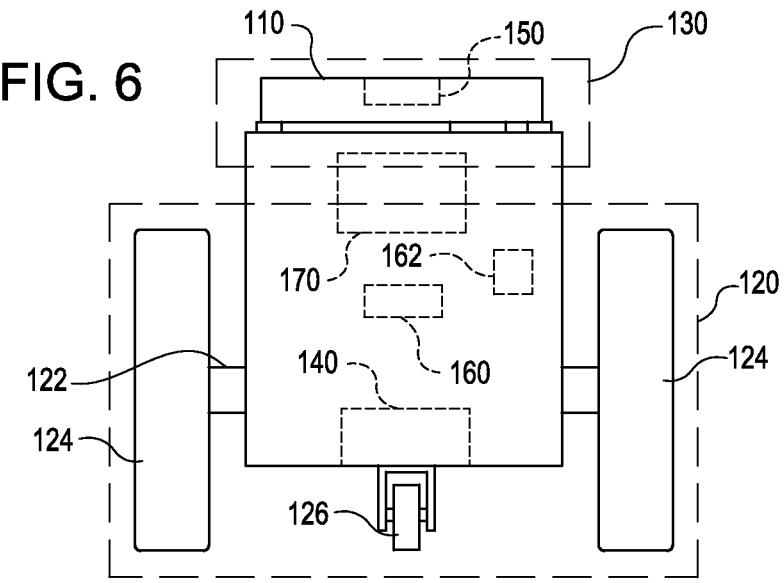
Figure 7:
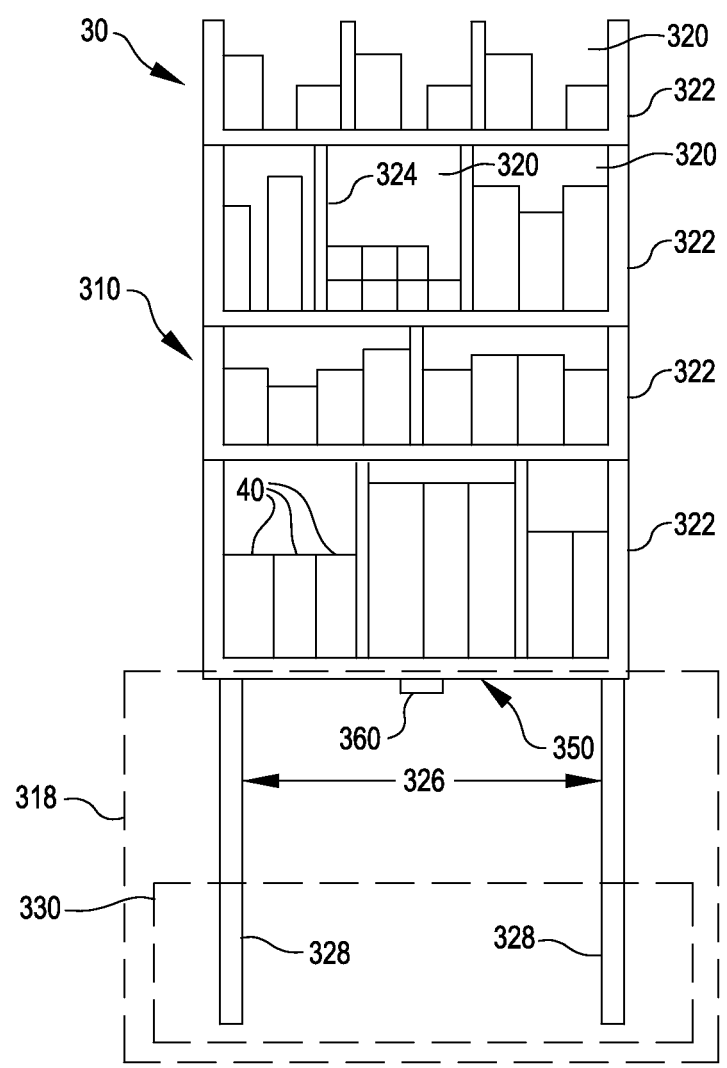
FIG. 7 illustrates in greater detail an example inventory holder that may be utilized in particular embodiments of the inventory system shown in FIG. 3.

FIGS. 5 and 6 illustrate in greater detail the components of a particular embodiment of mobile drive unit 20. In particular, FIGS. 5 and 6 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner.

For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 5 and 6 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 8:
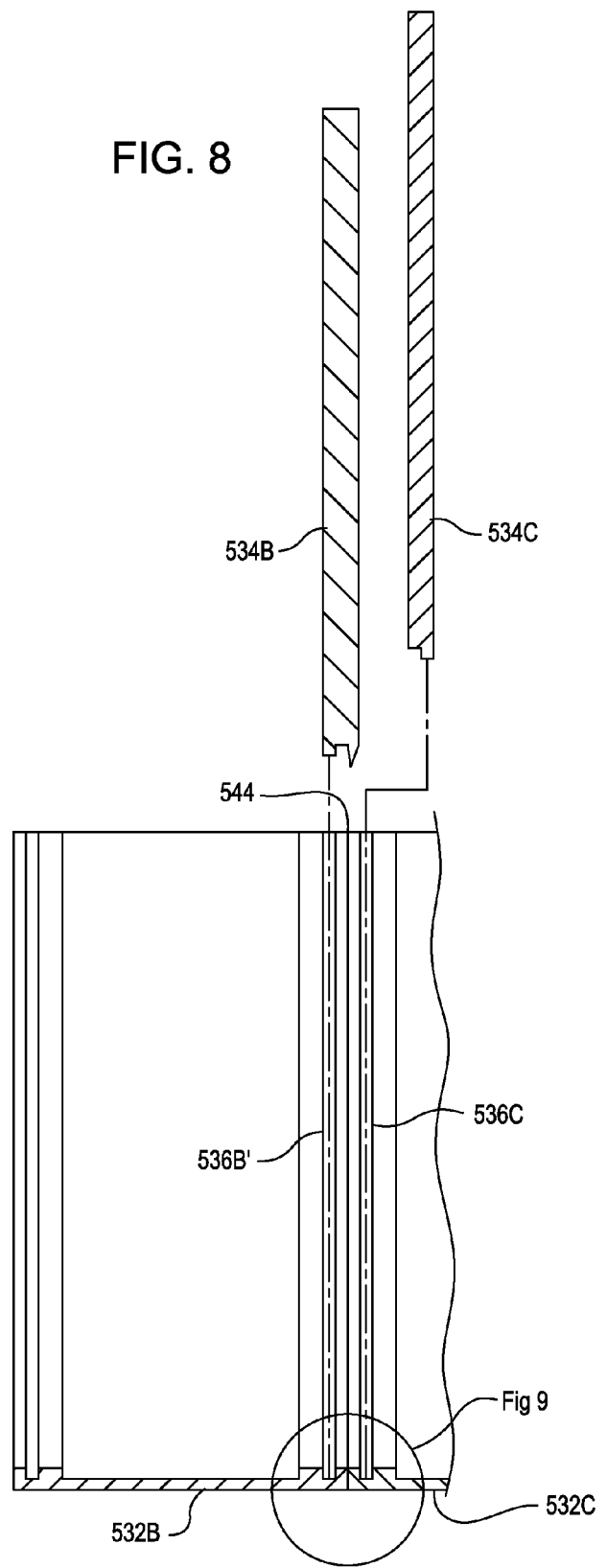
FIG. 8 is a side view illustrating installation of partitions relative to segments according to particular embodiments.
Figure 9:
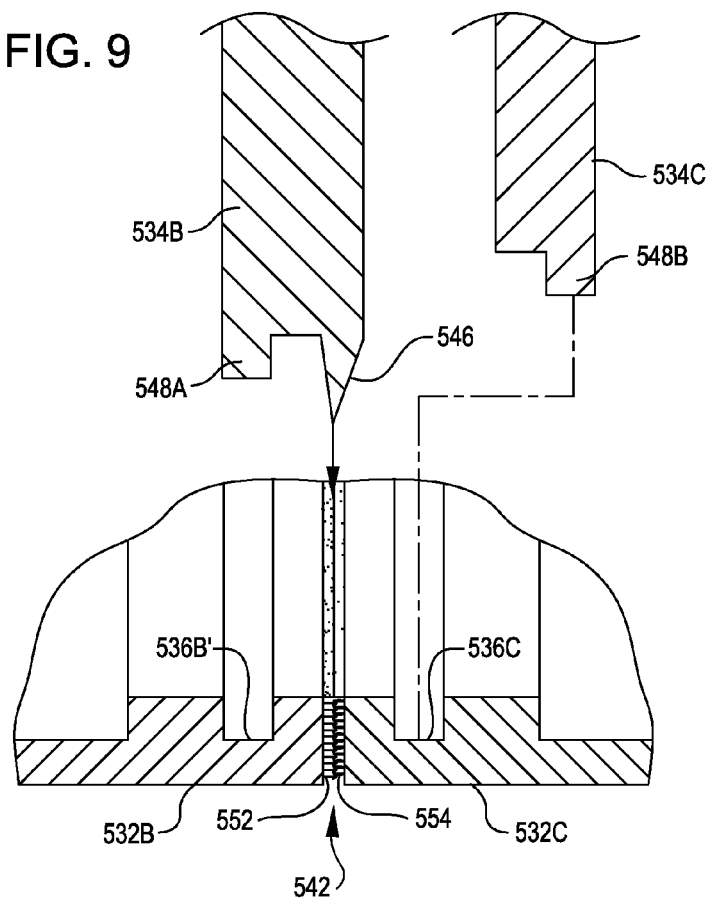
FIGS. 9 and 10 illustrate in greater detail features of the partitions of FIG. 8 for decoupling container segments joined by a coupling mechanism having hook and loop fasteners according to particular embodiments.
Figure 10:
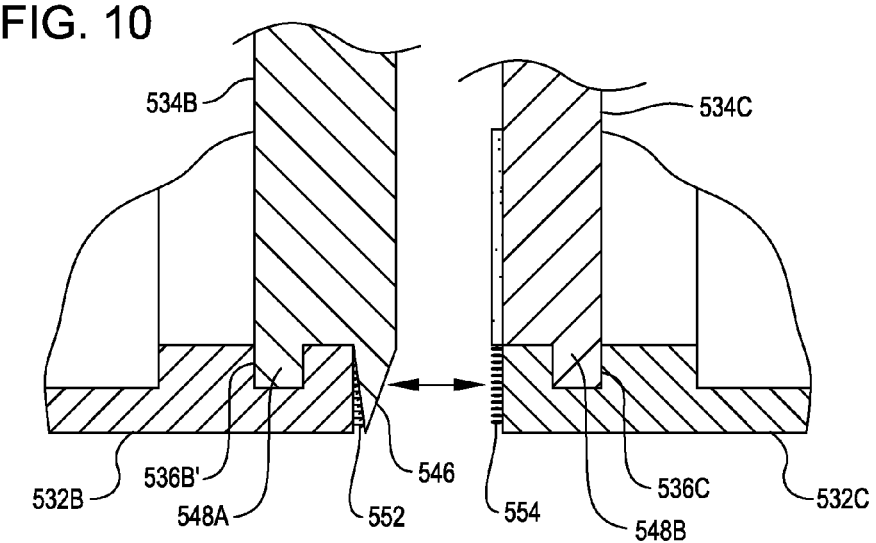

As described above, embodiments herein are directed to dynamically-sized containers 538 formed from segments 532 and partitions 534. Container segments 532 within a particular dynamically-sized container 538 may be joined together by a variety of coupling mechanisms. In various embodiments, the coupling mechanisms can be arranged such that the coupling mechanisms are prevented from coupling adjacent segments 532 when partitions 534 are in place along the edge dividing the adjacent segments 532. FIGS. 8 through 10 illustrate one example of the partitions 534B and 534C (e.g., of FIGS. 1-2) preventing a coupling mechanism 542 from coupling adjacent segments 532C and 532B when the partitions 534B and 534C are installed.

FIG. 8 illustrates a pair of partitions 534B, 534C being installed with respect to a pair of adjacent segments 532B and 532C. The partitions 534 can be installed into grooves 536 (e.g., individually denoted as 536B' and 536C in FIGS. 8-10) or other receiving features on either side of an edge 544 between the segments 532. The grooves 536 may be formed in any face, or a portion thereof, of the segment 532, including, but not limited to, the bottom, the sides or walls, or any combination thereof.

As may be more readily seen in FIG. 9, the partition 534B includes a flange 546 and a leg 548A. The leg 548A can be aligned to be received in the groove 536B' of the segment 532B. The partition 534C includes a similar leg 548B for interfacing with the groove 536C of the segment 532C. The segments 532B and 532C are coupled by a coupling mechanism 542 that includes a hook and loop fastener 542. The hook and loop fastener 542 includes a set of hooks 552 on the first partition 532B and a set of loops 554 on the second segment 532C (or vice versa). The flange 546 causes separation between the hooks 552 and the loops 554 as the flange is inserted into the edge 544 between the segments 532 (e.g., transitioned between the position shown in FIG. 9 to the position shown in FIG. 10). With reference to FIG. 10, when the leg 548A of the first partition 534B is received in the groove 536B' of the first segment 532B, the flange 546 covers the hooks 552 of the hook and loop fastener 542. With the flange 546 in place, the hooks 552 are prevented from engaging with the loops 554 and coupling the partitions 532B and 532C together.

In some embodiments, the other partition 534C may include a flange similar to the flange 546 of the first partition 534B. Thus, the partitions 534 may be mirror images of one another, or, alternatively, may be distinct geometrically such that only one of the two partitions 534 actually causes the decoupling of the coupling mechanism 542 in order to separate the segments 532 and/or prevent the pieces of the coupling mechanism 542 from engaging with one another. Additionally, although the base of the partitions 534 are each shown having a leg 548, in some embodiments, the base of the partition 534 is flat for receipt in the groove 536. In other arrangements, the flange 546 (if present) may extend from a side instead of a bottom of the partition 534. Furthermore, it will be appreciated that the hooks 552 and loops 554 may be reversed on the segments 532B or 532C from the arrangement shown in FIGS. 8-10.

Other coupling mechanisms and/or decouplers may also be utilized in addition—or as alternatives—to the features described with respect to FIGS. 8-10. For example, FIGS. 11 and 12 illustrate a coupling mechanism 1142 having a movable magnet 1156A. The left segment 1132B includes a magnet 1156A with a movable alignment. For example, the magnet is coupled with an arm 1158 that is pivotable to alter an alignment of the magnet 1156A. In a first position (as shown in FIG. 11), the movable magnet 1156A is aligned so as to have an opposite polarity aligned with another magnet 1156B in an adjacent segment 1132C (e.g., illustrated with a "+" of the magnet 1156A facing a "−" of the magnet 1156B). The opposite polarities being aligned between the magnets 1156A and 1156B cause the segments 1132 to be magnetically coupled to one another.

When the first partition 1134B is inserted into the first groove 1136B', the partition 1134B engages the arm 1158 so as to move the magnet 1156A into a different alignment such that the opposite polarities are no longer aligned (such as in FIG. 12). The change in alignment of the polarities may cause like polarities to be aligned with one another (e.g., illustrated with a "−" of the magnet 1156A facing "−" of the magnet 1156B), thereby causing the segments 1132 to repel one another.

Variations from the arrangement shown in FIGS. 11-12 are also possible. In some embodiments, one or both of the partitions 1134 may include features for changing an alignment of a magnet 1156 of a coupling mechanism 1142. For example, a magnet 1156 to the left of a joint between adjacent segments 1132 (e.g., the magnet 1156A on the segment 1132B in FIG. 11) may be rotated clockwise by a quarter turn in conjunction with a magnet 1156 to the right of the joint (e.g., the magnet 1156B positioned on the opposite segment 1132C in FIG. 11) also being rotated clockwise by a quarter turn. Such rotation can cause the aligned polarities to change positions so that the poles of the respective magnets 1156 are arranged opposite other poles of the same polarity to cause a repelling force (e.g., so that both negative poles of the magnets 1156A and 1156B are facing the top of FIG. 11 and both positive poles of the magnets 1156A and 1156B are facing the bottom of FIG. 11). In some embodiments, other shapes or kinds of magnets 1156 may be utilized. For example, magnets 1156 shaped like horseshoes may be positioned in adjacent segments 1132 and arranged in a common plane so that opposite polarities are aligned for producing an attracting force for coupling the segments 1132, and the magnets 1156 can be rotated a quarter turn in opposite directions (e.g., each to an orientation perpendicular to the original plane) to align like polarities for producing a repelling force to decouple the segments 1132. In some aspects, magnets 1156 are spring loaded so as to return to a default position in which the polarities will be aligned with other magnets 1156 of other adjacent segments 1132 when the partitions 1134 are removed.

Figure 13:
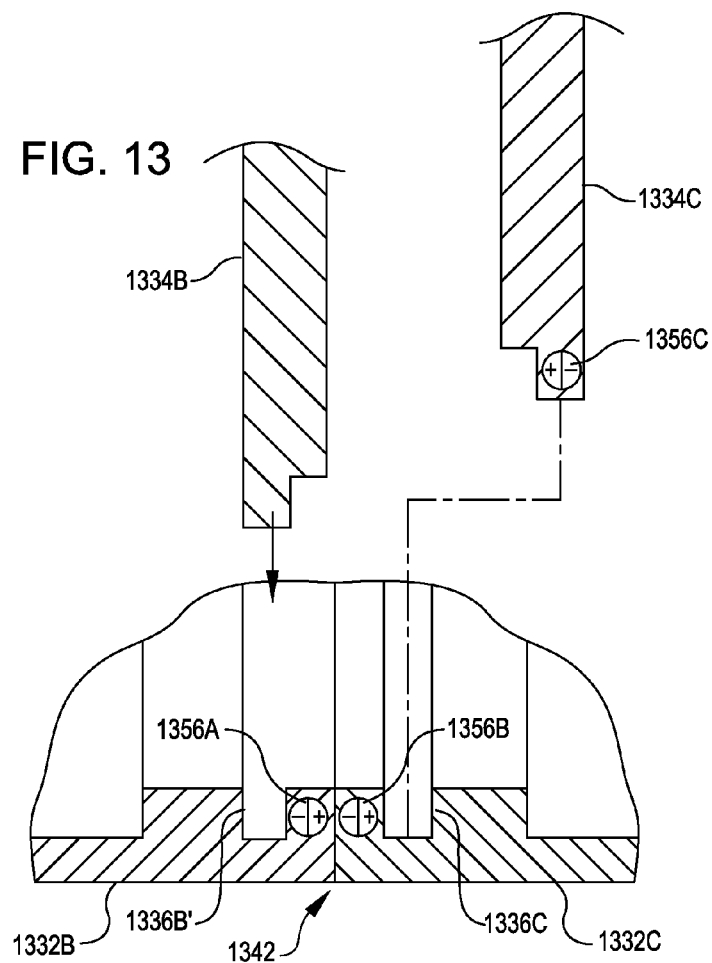
FIGS. 13 and 14 illustrate an example of partitions for decoupling another coupling mechanism having magnets according to particular embodiments.
Figure 14:
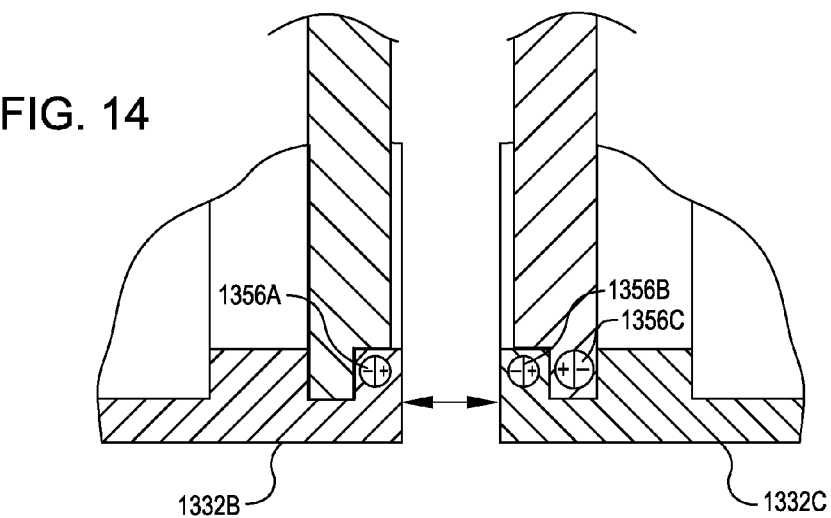

FIGS. 13 and 14 illustrate another coupling mechanism 1342 including magnets 1356. A first magnet 1356A is positioned in a first segment 1332B to face an opposite polarity of a second magnet 1356B that is positioned in the second segment 1332C. The opposite polarities cause the segments 1332 to be coupled with one another magnetically in response to the attraction force between the opposite polarities of the magnets 1356A and 1356B. A magnet 1356C in the partition 1334C can change a magnetic field between the magnets 1356A, 1356B in the segments 1332. For example, the partition 1334C in the illustrated example includes a larger or stronger magnet 1356C with a polarity arranged such that the magnetic force provided by the magnet 1356C when the partition 1334C is engaged in the groove 1336C overpowers or obviates the magnetic force provided by the magnet 1356B in the segment 1332C that receives the partition 1334C. Hence, as shown in FIG. 14, the greater magnetic force of the positive polarity of the magnet 1356C will cause a repelling force with respect to the magnet 1356A in the segment 1332B, despite the presence of the magnet 1356B in the segment 1332C, and provide a repelling force sufficient to separate the segments 1332 and/or prevent coupling of the segments 1332.

Figure 15:
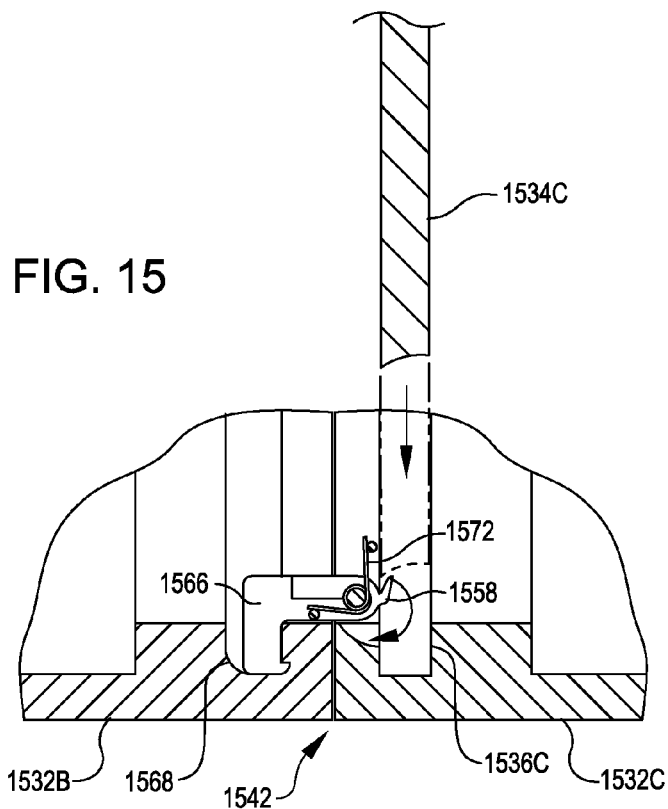
FIGS. 15 and 16 illustrate an example of partitions for decoupling a coupling mechanism having a latch and a notch according to particular embodiments.
Figure 16:
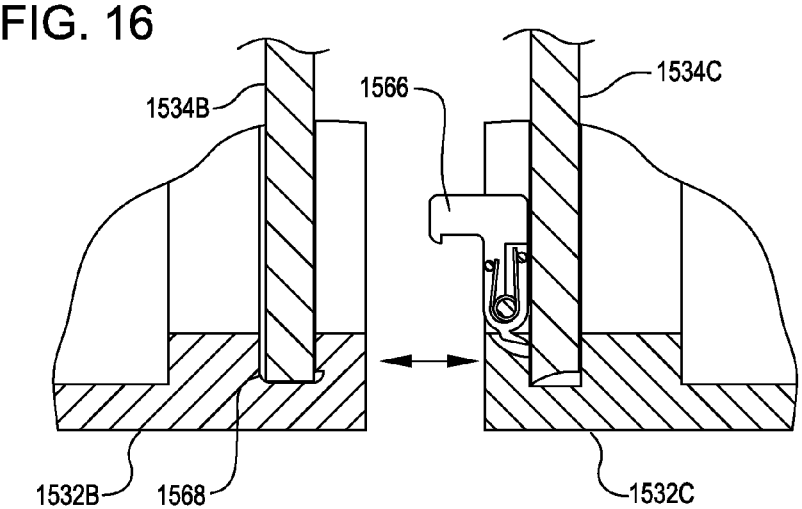

FIGS. 15 and 16 illustrate a coupling mechanism 1542 having a latch 1566 and a notch 1568 (or other latch receiving structure) disposed on opposite segments 1532 of adjacent segments 1532B and 1532C. The latch 1566 is received in the notch 1568 in order to couple the adjacent segments 1532. The partition 1534C, when inserted into the groove 1536C, engages an arm 1558, causing the latch 1566 to rotate out of the notch 1568 and decouple the coupling mechanism 1542, thereby separating the segments 1532 from one from another. The latch 1566 is equipped with a spring 1572 to otherwise bias the latch 1566 into the notch 1568 and bias the segments 1532 into a coupled arrangement. As illustrated in FIG. 16, insertion of the other partition 1534B into the notch 1568 may prevents the latch 1566 from engaging the notch 1568, which may prevent the segments 1532 from recoupling when the initial partition 1534C is removed. In some embodiments, the segment 1532B can include a groove or other receiving feature for receiving the partition 1534B that is distinct from the notch 1568 for receiving the latch 1566.

Figure 17:
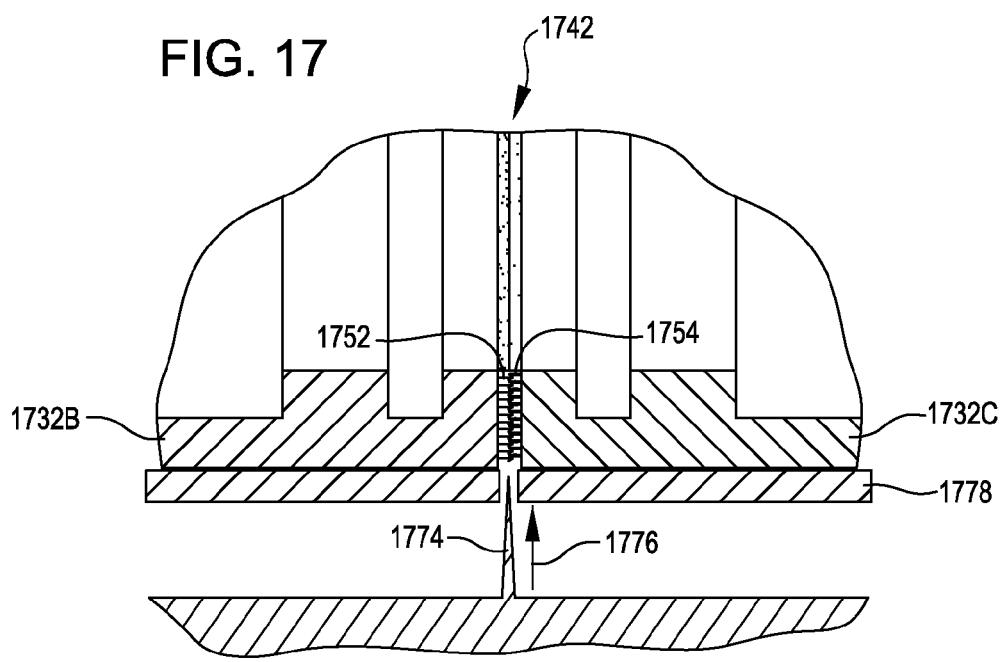
FIGS. 17-19 illustrate an example of a distinct decoupler for decoupling a coupling mechanism having hook and loop fasteners according to particular embodiments.
Figure 18:
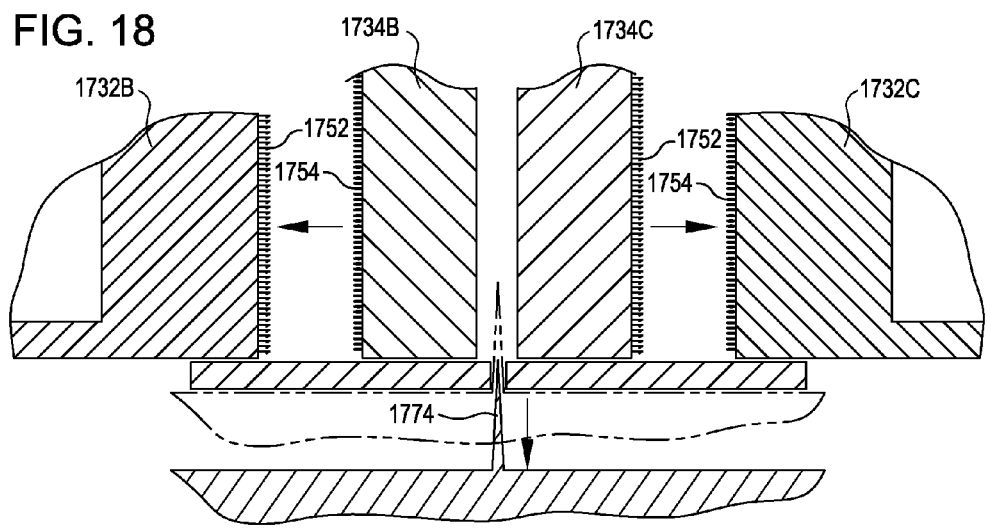
Figure 19:
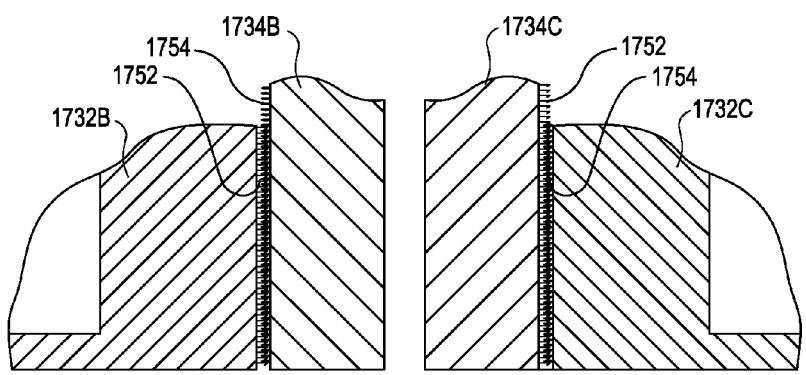

In various embodiments, a decoupler may be provided that is separate or distinct from the partitions. For example, FIGS. 17 through 19 illustrate an example of a distinct decoupler 1774 for decoupling a coupling mechanism 1742 having hooks 1752 and loops 1754. In the illustrated example, the decoupler 1774 is a wedge or spike that can be actuated (as shown by arrow 1776) from a surface 1778 supporting coupled segments 1732. As seen from FIG. 18-19, the separator spike 1774 can be retracted (e.g., from the position shown in phantom line to the position shown in solid line), and partitions 1734 having mating sets of hooks 1752 and loops 1754 can be inserted between the segments 1732 (e.g., FIG. 18) and attached to the hooks 1752 and loops 1754 on the segments 1732 (e.g., FIG. 19). As may be also appreciated, in some embodiments, partitions may be attached via end faces of segments (e.g., FIGS. 17-19) instead of via top faces of the segments (e.g., FIGS. 8-10).

Figure 20:
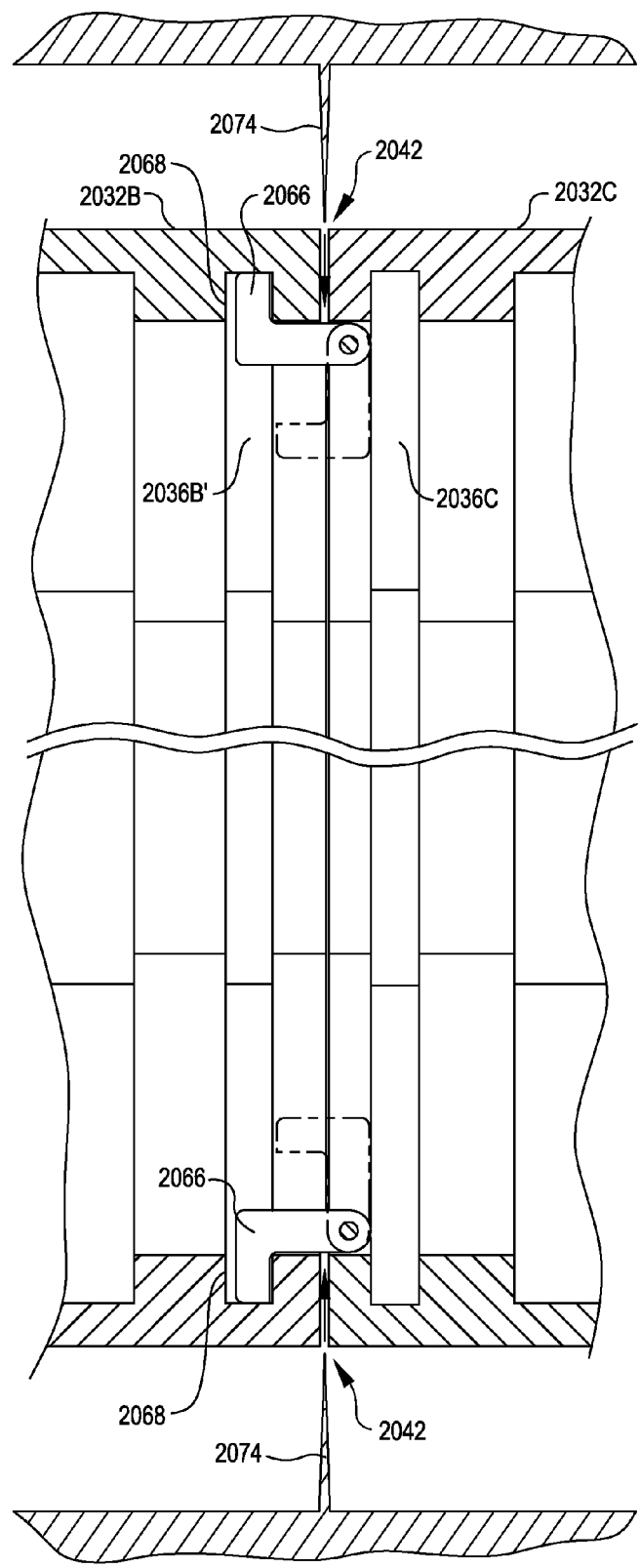
FIG. 20 is a top view illustrating examples of distinct decouplers for decoupling coupling mechanisms having latches and notches according to particular embodiments.

Although the description herein has primarily illustrated coupling mechanisms positioned in a bottom of a segment, in some embodiments, the coupling mechanism can additionally or alternatively be positioned in a side of the segment. For example, FIG. 20 is a top view illustrating an alternative arrangement of a coupling mechanism 2042 having latches 2066 arranged to engage notches 2068 situated in the sides of a segment 2032. Similar to the embodiment described with respect to FIG. 17 through 19, the latches 2066 illustrated in FIG. 20 may be pushed out of coupling engagement by wedges of decouplers 2074 that are distinct from partitions to be inserted into the grooves 2036 in the adjacent segments 2032.

As may be appreciated from the description herein, dynamically-sized containers (e.g., containers 538 shown in FIG. 2) may be constructed or formed by human operators and/or automation (such as conveyors for moving segments or groups of segments, devices for inserting partitions, and/or actuators for moving decouplers). In some aspects, the individual segments 532 are coupled together and then bounded by partitions 534 on the extreme ends of the coupled group. In other embodiments, the segments 532 are presented in a chain of coupled segments 532, and the segments 532 are separated from this default position by a decoupler (which may be distinct from or part of a partition 534) so as to facilitate the insertion of partitions 534 into receiving structures 536 of the segments 532 such that the partitions 534 prevent coupling with adjacent segments 532.

In some embodiments, the management module 15 (e.g., FIG. 4) may direct production of dynamically-sized containers 538. For example, the management module 15 may determine a particular inventory item 40 or set of inventory items 40 that are to be combined into a container 538. Based on the identified items 40 and their characteristics, such as height, weight, or other dimensions, the management module 15 may determine an appropriate length for the container 538. Based at least in part on that length, the management module 15 may instruct a corresponding number of segments 532 to be utilized for constructing a container 538. For example, the management module 15 can provide instructions to a human operator and/or guide automated components. The management module 15 may also instruct the identified items 40 to be placed in the container that has been produced by the number of segments 532 and partitions 534, such as to reduce an amount of wasted space occurring within the inventory system 10.

In some aspects, containers 538 that are dynamically-sized according to width or height (e.g., in addition to a length that is determined by the number of segments 532 utilized) may be provided. In such circumstances, alternate sets of segments may be utilized that have a different height or width. As an illustrative example, three different sizes of segments (e.g., small, medium, and large) may be available and a dynamically-sized volume may be provided for a dynamically-sized container by selecting a number of segments from a particular set in order to obtain a container of the desired size (e.g., selecting a particular number of segments of a small segment group in order to obtain a container appropriately sized for a particular inventory item or set of inventory items).

In some aspects, multiple types of coupling mechanisms are available, and the management module 15 may determine which type of coupling mechanism 15 to use based on one or more characteristics of an item to be stored in a container. For example, a heavier item may be assigned to a container constructed with latch coupling mechanisms based on a determination that the weight of the item is too great for the capacity of the hook and loop fasteners and/or the magnet fasteners.

Additionally, although for ease of understanding much of the description herein has set forth features individually (or as alternatives to one another), any of the features of the embodiments described herein (e.g., with respect to FIGS. 1, 2, and 8-20) can be used in various combinations. For example, embodiments may include combinations with different types of coupling mechanisms, combinations with or without distinct decouplers, combinations of locations of coupling mechanisms or other features (e.g., on bottom and/or sidewalls of containers), combinations with any number and/or arrangement of coupling mechanisms, etc.

Figure 21:
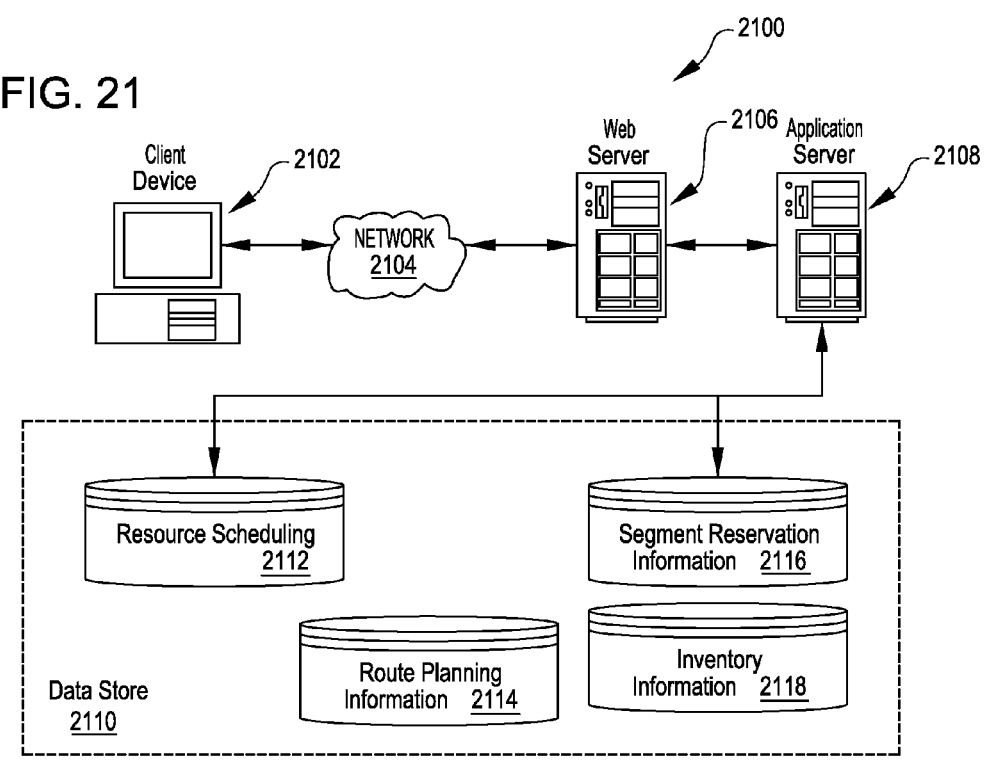
FIG. 21 illustrates an environment in which various features of the inventory system can be implemented, in accordance with at least one embodiment.

FIG. 21 illustrates aspects of an example environment 2100 for implementing aspects in accordance with various embodiments. As will be appreciated, although a Web-based environment is used for purposes of explanation, different environments may be used, as appropriate, to implement various embodiments. The environment includes an electronic client device 2102, which can include any appropriate device operable to send and receive requests, messages, or information over an appropriate network 2104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2102 and the application server 2108, can be handled by the Web server. It should be understood that the Web and application servers are not required and are merely example components, as structured code discussed herein can be executed on any appropriate device or host machine as discussed elsewhere herein.

The data store 2110 can include several separate data tables, databases or other data storage mechanisms and media for storing data relating to a particular aspect. For example, the data store illustrated includes mechanisms for storing information which can be used by modules described herein, such as resource scheduling information 2112, route planning information 2114, segment reservation information 2116, and/or inventory information 2118. It should be understood that there can be many other aspects that may need to be stored in the data store, such as for page image information and to access right information, which can be stored in any of the above listed mechanisms as appropriate or in additional mechanisms in the data store 2110. The data store 2110 is operable, through logic associated therewith, to receive instructions from the application server 2108 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the system 2100 in FIG. 21 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A container system, comprising:
    a plurality of container partitions comprising bottom, left, and right outer edges;
    a plurality of container segments, each comprising:
    a trough-shaped body having bottom, left, and right sidewalls;
    a front edge of the bottom, left, and right sidewalls, the front edge comprising a front coupling mechanism;
    a rear edge of the bottom, left, and right sidewalls, the rear edge comprising a rear coupling mechanism configured to releasably attach the front coupling mechanism of an adjacent container segment;
    a first receiving feature positioned adjacent to the front edge and configured to receive at least a portion of the bottom, left, or right outer edges of a first container partition of the plurality of container partitions, such that the first container partition when received in the first receiving feature extends along the bottom, left, and right sidewalls adjacent to or at the front edge; and
    a second receiving feature positioned adjacent to the rear edge and configured to receive at least a portion of the bottom, left or right outer edges of a second container partition such that the second container partition when received in the second receiving feature extends along the bottom, left, and right sidewalls adjacent to or at the rear edge;

wherein one or more container segments and two or more container partitions can be assembled to form a plurality of independently movable containers of different sizes, each container comprising (i) one container segment of the plurality of container segments or two or more container segments of the plurality of container segments coupled via respective front and rear coupling mechanisms, (ii) a first container partition of the plurality of container partitions received in a first receiving feature at a first end of the container, and (iii) a second container partition of the plurality of container partitions received in a second receiving feature at a second opposite end of the container.

2. The container system of claim 1, wherein at least one of the front coupling mechanism or the rear coupling mechanism comprises at least a part of a hook and loop fastener.

3. The container system of claim 2, wherein at least one of the container partitions comprises a flange disposed so as to block access to hooks or loops of the hook and loop fastener when said container partition is received in one of the first receiving feature or the second receiving feature.

4. The container system of claim 2, wherein at least one of the container partitions comprises hooks or loops arranged to couple with hooks or loops of the hook and loop fastener when said container partition is received in one of the first receiving feature or the second receiving feature of a container segment so as to prevent the hooks or loops of the hook and loop fastener from releasably attaching the container segment to an adjacent container segment.

5. The container system of claim 1, wherein at least one of the front coupling mechanism or the rear coupling mechanism comprises at least a part of a set of magnets arranged so that opposite polarities are aligned to cause a coupling attraction force.

6. The container system of claim 5, wherein at least one of the container partitions is configured to move one or more of the magnets of the set of magnets so that the opposite polarities are out of alignment to reduce or eliminate the coupling attraction force when said container partition is received in one of the first receiving feature or the second receiving feature.

7. The container system of claim 5, wherein at least one of the container partitions includes one or more magnets configured to alter a magnetic field to reduce or eliminate the coupling attraction force when said container partition is received in one of the first receiving feature or the second receiving feature.

8. The container system of claim 1, wherein at least one of the front coupling mechanism or the rear coupling mechanism comprises at least a part of a latch and a latch receiving structure.

9. The container system of claim 8, wherein at least one of the container partitions is configured to bias the latch out of the latch receiving structure when said container partition is received in one of the first receiving feature or the second receiving feature.

10. The container system of claim 8, wherein at least one of the container partitions is configured to block the latch from being received by the latch receiving structure when said container partition is received in one of the first receiving feature or the second receiving feature.

11. The container system of claim 10, wherein said one of the first receiving feature or the second receiving feature comprises said latch receiving structure.

12. The container system of claim 1, wherein the plurality of container segments and the plurality of container partitions are configurable to form a plurality of containers that each i) is configured for receiving one or more inventory items, and ii) comprises a series of one or more interconnected container segments of the plurality of container segments, a leading container partition of the plurality of container partitions positioned so as to bound a leading end of the series, and a trailing container partition of the plurality of container partitions positioned so as to bound a trailing, opposite end of the series; and wherein the container system further comprises a management module comprising one or more processors and a memory having stored therein instructions that, when executed by the one or more processors, cause the management module to at least:

receive information about a particular inventory item or set of inventory items to be placed in a container;

determine a container length to accommodate the particular inventory item or set of inventory items;

determine a combination of container segments that provide at least the determined container length when interconnected in series;

instruct that a container be formed with the determined combination of container segments interconnected in series and bounded at a leading end by a leading container partition and at a trailing end by a trailing container partition; and instruct that the particular inventory item or set of inventory items be placed in the formed container.

13. The container system of claim 12, wherein at least one end of each container segment includes at least a portion of a coupling mechanism for attaching to at least one other end of an adjacent container segment.

14. The container system of claim 13, wherein each coupling mechanism comprises at least one of a hook and loop fastener, a pair of magnets, or a latch and latch-receiving structure.

15. The container system of claim 13, wherein the management module is further configured to select a type of coupling mechanism for interconnecting the combination of container segments in series based on one or more characteristics of the particular inventory item or set of inventory items to be placed in the formed container.

16. The container system of claim 12, wherein the plurality of container segments includes a first subset of container segments having a first width or height and a second subset of container segments having a second, different width or height, wherein the management module is further configured to:

determine a container width or height to accommodate the particular inventory item or set of inventory items; and instruct, based on the determined container width or height, that the container be formed of container segments from the first subset or from the second subset.

17. A container comprising:

a plurality of segments, each segment comprising a trough having a front edge, a rear edge, and left and right sidewalls extending between the front edge and the rear edge;

a plurality of couplers connecting the plurality of segments, each of the couplers connecting a pair of adjacent segments and having a first component at or adjacent the rear edge of one segment of the pair and a second component at or adjacent the front edge of the other segment of the pair, each of the couplers configured to decouple upon interaction with a decoupler so as to cause the first and second components to decouple from one another and cause the pair of adjacent segments to disconnect from one another;

a plurality of receiving structures, each segment of the plurality of segments comprising a front receiving structure at or adjacent to the front edge and a rear receiving structure at or adjacent to the rear edge;

a first partition received in a front receiving structure of a segment at a first end of the plurality of segments; and a second partition received in a rear receiving structure of a segment at a second, opposite end of the plurality of segments.

18. The container of claim 17, wherein at least one decoupler comprises a partition received in a receiving structure of one of the segments of a pair of adjacent segments coupled by a coupler.

19. The container of claim 17, wherein at least one decoupler comprises a structure distinct from a partition received in a receiving structure of one of the segments of a pair of adjacent segments coupled by a coupler.

20. The container of claim 17, wherein the container is configured for subdivision into additional containers by receipt of additional partitions into adjacent receiving structures of a pair of adjacent segments separated by interaction of a decoupler with a coupler.

* * * * *